March 31, 1931.  A. W. FREHSE  1,798,936
FRONT WHEEL BRAKE
Filed Feb. 18, 1928   2 Sheets-Sheet 1

Inventor
Albert W. Frehse
By Blackmore, Spencer & Fluck
Attorneys

March 31, 1931.  A. W. FREHSE  1,798,936

FRONT WHEEL BRAKE

Filed Feb. 18, 1928  2 Sheets-Sheet 2

Inventor
Albert W. Frehse

By Blackmore, Spencer & Hiscock
Attorneys

Patented Mar. 31, 1931

1,798,936

UNITED STATES PATENT OFFICE

ALBERT W. FREHSE, OF DETROIT, MICHIGAN, ASSIGNOR TO GENERAL MOTORS CORPORATION, OF DETROIT, MICHIGAN, A CORPORATION OF DELAWARE

FRONT-WHEEL BRAKE

Application filed February 18, 1928. Serial No. 255,439.

This invention relates to brakes and is concerned particularly with the actuating mechanism for applying brakes used with the swivelling front wheels of vehicles.

An object of the invention is to provide a simple arrangement for applying the actuating means for front wheel brakes in such a way that the steering movements of the wheels will not affect the intensity of brake action. A further object is to provide an arrangement associated with the actuating means for making adjustments to correct for wear of the linings. As another object, the invention provides a convenient and readily accessible means for making such adjustments. Other objects and advantages will be understood after reading the following description and examining the accompanying drawing.

Figure 2:
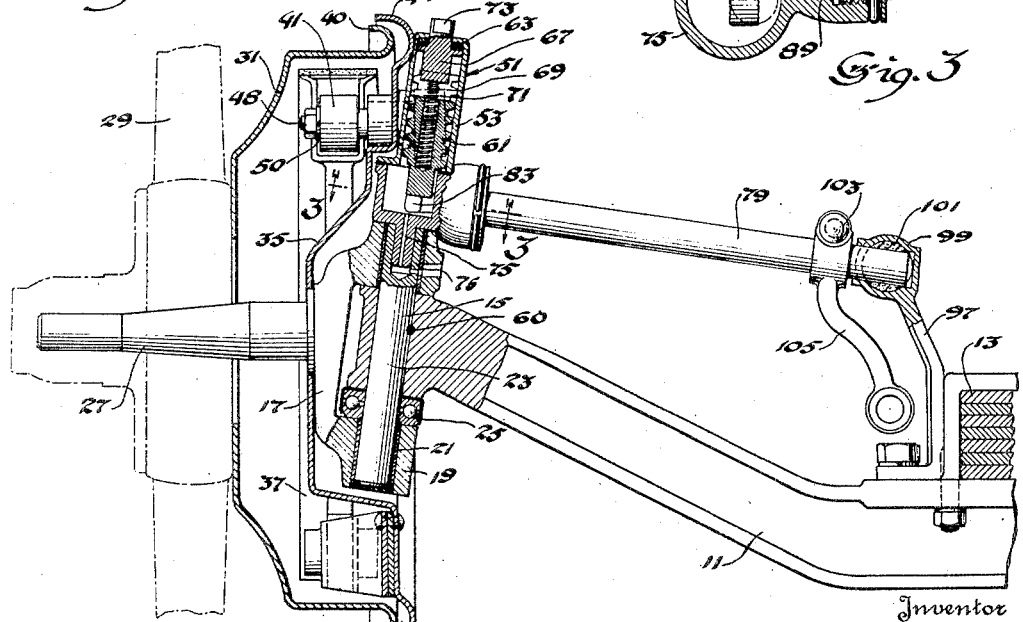
Figure 2 is a sectional view transversely of the vehicle through the brake drum and actuating mechanism.

Referring by reference characters to the drawing, numeral 11 represents a front axle of a vehicle, which axle is to support a chassis frame (not shown) through the instrumentality of springs, one of which is shown in Figure 2 and designated by numeral 13.

The end of axle 11 is apertured as at 15 and the usual steering knuckle 17 is formed with forks 19 straddling the end of the axle, the forks being apertured as at 21 to register with the axle aperture. The several registering apertures are to receive the usual knuckle pin or king bolt 23 whereby the knuckle swivels about the axle. A suitable bearing 25 may be located between the axle end and the lower knuckle fork.

The knuckle is formed with a spindle or stub axle 27 to rotatably carry the steering wheel 29. To the inner side of the steering wheel is secured in any preferred manner a drum 31. To the knuckle is secured as by fastening means 33 a backing plate or dust guard 35. Within the enclosure defined by the rotating wheel drum and the relatively fixed backing plate are to be mounted the friction means, such for example, as shoes 37, which frictionally engage the drum and check or stop the rotation of the wheel. As is usual, shoes 37 are pivotally anchored to the backing plate, being suitably supported by pivot pins 39. The free adjacent ends of the shoes are to be swung oppositely about their pivots 39 into engagement with the drum, preferably by cam 41, engaging rollers 43 rotatably carried at the ends of the shoes 37. To the better prevent the entrance into the drum of foreign matter which may interfere with the action of the brake and cause undue wear of linings and drum, the adjacent peripheral edges of the drum and backing plate are curved outwardly into parallelism, as at 40 and 44 respectively.

The need of mounting the cam 41 that it may move bodily to accommodate self-actuation as well as rotatably to expand the shoes into engagement with the drum is well recognized. In the present instance, the cam 41 is formed with a slot 45 substantially rectangular in shape and slidably receiving rectangular block 47 carried by the camshaft 49. When the camshaft is rotated and the shoes expanded into frictional engagement with the drum it is possible for the cam to move bodily along the member 47 carried by camshaft to accommodate itself to the influence of the rotating drum upon the shoes, and to thereby permit equal division of the pedal applied force upon the two shoes. When the pedal is released, the brake-releasing spring which may be of any preferred form restores the brake shoes and cam to their normal relative position. The position of the block 47 and consequently of the cam upon the brake release is such as to insure the centralized position of the shoes and cam as a whole. Too free movement of the cam on block 47 is prevented by means of a nut 48 and a lock washer 50, these parts serving to hold the cam against a shoulder on the camshaft.

A housing member 51 is provided with a tubular portion 53 and a laterally disposed part 55 in which last-named part is located a pinion 57 carried by camshaft 49. The laterally disposed part 55 serves to form journal bearing for the camshaft and projects through the backing plate. The housing member as a whole may be secured to the backing plate by fastening means 59. Slidably and rotatably mounted in the tubular part 53 is a worm rack 61 having spiral teeth engaging the above mentioned pinion 57. Fixed tightly within the top of tubular part 53 is a serrated washer 63. Numeral 65 designates the co-operating serrated flange carried by a stem 67 rectangular in cross section and slidably mounted in a correspondingly shaped slot 69 cut into the upper end of the worm rack 61.

Figure 4:
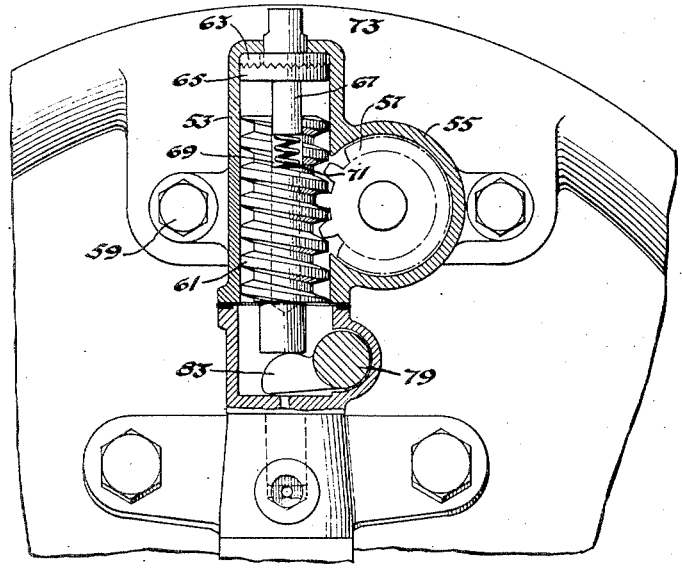
Figure 4 is a view in elevation of the backing plate, showing the actuating mechanism.
Figure 6:
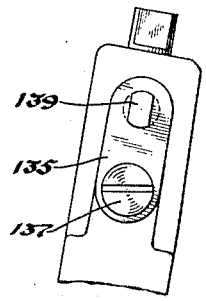
Figure 6 illustrates in elevation a detail of parts shown in Figure 5.
Figure 7:
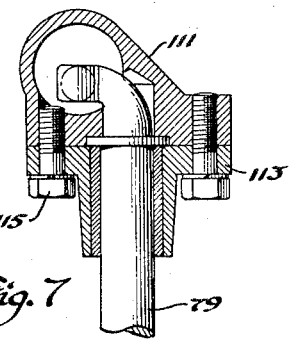
Figure 7 is a detail in section on line 7—7 of Figure 5.
Figure 5:
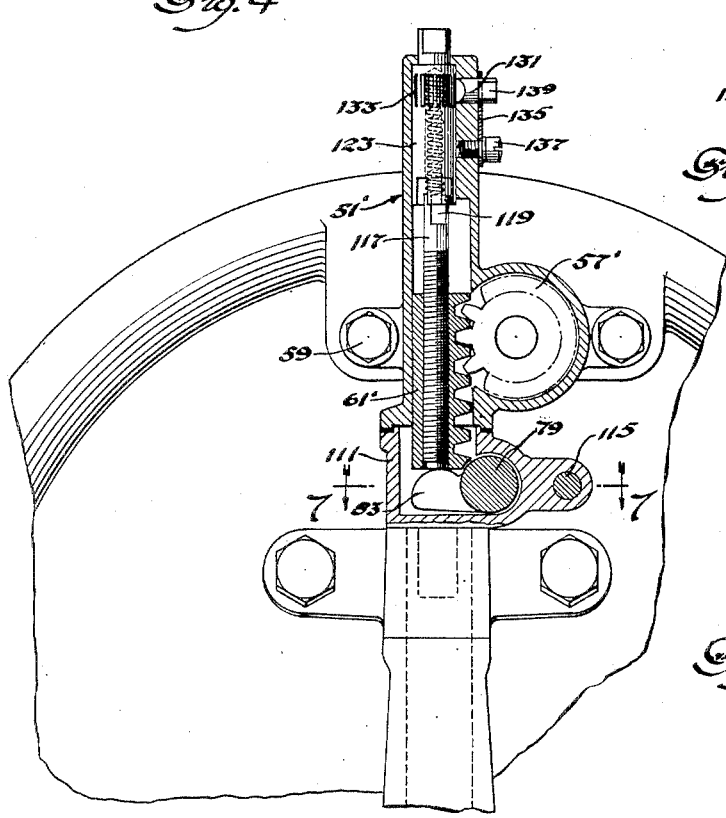
Figure 5 is a view corresponding to Figure 4 but illustrating a modified form.
Figure 8:
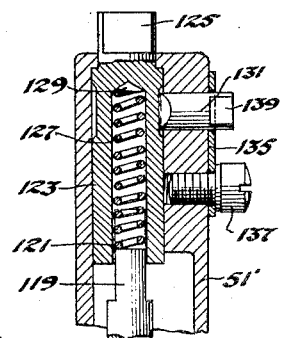
Figure 8 is a vertical section through the adjusting means illustrated in Figure 5.

The rectangular shape of the stem 67 will be seen by comparison of Figure 2 and Figure 4, which are sections at right angles to each other. From the bottom of slot 69 rack 61 is axially bored out to house a spring 71 seated at the bottom of the opening and engaging the lower end of the stem 67. This spring serves to hold the serrated flange and washer in engagement to thereby prevent rotation of the rack upon actuation of the brake. It also serves to restore the rack and pinion and the cam to normal position when the brake applying force is relieved. Above the disc 65, stem 67 may be circular in section and pass through an opening in the top of the casing member 53. Outside the tubular part 53, the stem may be flattened as at 73 to be engaged by a wrench or other tool.

Press fitted into the upper end of the king pin 23 which is preferably secured for rotation relative to the axle by suitable means as at 60, is the lower projecting stem 76 of a hollow cup 75. As illustrated, the lower end of part 53 is shaped to rotatably engage the upper end of cup 75. Cup 75 has a lateral and inwardly projecting part 77 for the rotatable support of the outer end of a rockshaft 79. Shaft 79 is positioned substantially parallel with the axle and perpendicular to the center line of the king pin. It has an angularly positioned lever end as at 81 which end is provided with a convex cylindrical upper surface 83 within the cup 75, as shown in Figure 4. This cylindrical end engages the lower end of the worm rack 61.

Rockshaft 79 has a flange 85 engaging a ball 87 seated within a spherical inner wall 89 of part 77. Shaft 79 passes through an axial opening 91 in the ball, as shown. For maintaining the ball in position a ring 93 is threaded into the end of housing 77 and a retaining wire, or the like, 95 is seated in a groove on the outer surface of part 77, its end being inwardly directed through registering openings in the housing 77 and in the ring 93. For supporting the inner end of shaft 79, axle 11 is provided with a bracket 97, the latter secured to the axle adjacent the vehicle spring 13. At the upper end of the bracket is a cup-shaped part 99 co-operating with a cup-shaped separable cover member, the cup-shaped members housing a ball 101 through a hole in which passes the shaft 79. Secured to shaft 79 by fastening means 103 is an arm 105 to be connected to the pedal by any preferred linkage. The ball joints at the ends of shaft 79 afford the necessary flexible support to accommodate any deflection or misalignment of parts.

In the operation of the brake, the rockshaft 79 is oscillated by a suitable brake hook-up associated with the brake pedal or lever. The cylindrical end 83 on the lever associated with shaft 79 swings upwardly and produces an upward reciprocating movement of rack 61. The pinion 57 is thereby rotated and the camshaft and cam are rotated to expand the shoes into frictional engagement with the drum. The movable mounting of the cam permits the self-actuation of the brake due to drum rotation and thereby minimizes pedal pressure. In steering, the axis of the cylindrical surface of the lever end of shaft 79 and the flat surface of the worm rack always lie in the same plane so that steering in no way interferes with braking. When adjustment is needed to make correction for lining wear, the rack is rotated instead of being reciprocated. This rotation is effected by the application of a wrench to the flat end of stem 67. As the stem is rotated, it turns the worm rack owing to the non-circular relation between said parts, and through the engagement of the teeth of the rack and pinion the cam is rotated to a new release position. In this way, the clearance between the shoes and the drum is very conveniently taken up. As the stem is turned in making this adjustment, the spring 71 yields sufficiently to permit the teeth of the serrations between parts 65 and 63 to pass over one another. The clicks, as the teeth pass over one another, may be counted to measure the degree of adjustment.

Figure 1:
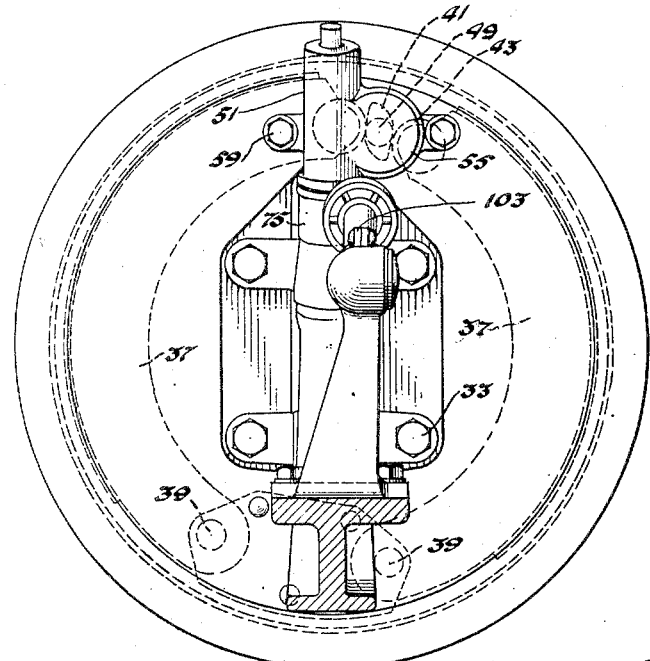
Figure 1 is a view of a front wheel brake mechanism in elevation, the view showing the front axle in section.
Figure 9:
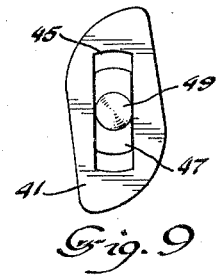
Figure 9 is a sectional detail of a cam used in expanding the shoes.
Figure 3:
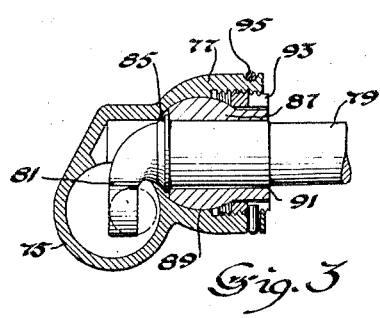
Figure 3 is a sectional view of a detail, the view being on the line 3—3 of Figure 2.

Figures 5, 6, 7 and 8 illustrate a slight modification. In this form of the invention, shaft 79 is mounted in the same relative position to the axle and king pin. Its inner end is mounted in a bracket 97, as before described. At its outer end it is rotatably carried in a casing 111, this casing taking the place of part 75 in the form shown in Figure 1 and being similarly carried by the king pin. In place of the ball joint of the form first described, the shaft 79 is rotatably journaled in a cover member 113 secured to the casing 111 by fastening means 115.

In this form of the invention, as before, the fastening means 59 secure to the backing plate a part 51' corresponding to part 51 of the form first described. In place of the worm rack there is used a conventional rack 61' engaging a spur pinion 57'. This pinion 57' is carried as before on a camshaft provided with a cam, the relation of the cam to the brakes being unchanged.

Threaded in a tubular bore of the rack is a rod 117, the lower end of which engages the rounded end of the lever carried by shaft 79. Rocking of shaft 79 raises the rod 117 and with it a rack threaded thereto. This reciprocation of the rack rotates the pinion 57' and applies the brake as will be understood. Adjustment to reduce shoe clearance is effected by rotating rod 117 but without reciprocation thereof, such movement effecting an upward reciprocation of rack 61'. To accomplish this result, rod 117 has a flat portion 119, at its upper end which flat portion engages within a similar shaped opening 121 in a cylindrical member 123. This cylindrical member projects above the upper end of the casing and has a flat end 125 for engagement with a wrench or the like. A coil spring 127 is located within an axial bore of the cylindrical member being in abutment with the end of the bore as at 129 and at its lower end engaging the upper end of rod 117. This spring serves to return the camshaft to its normal position, when the brake is released, through its resilient action upon the rack and pinion. At 131 is a detent slidable radially through the wall of the casing. This detent engages with vertical serrations 133 on the outer wall of the cylindrical member 123. The detent is resiliently held in contact with the serrations by flat spring 135, the spring being held by a screw or the like 137 and yieldingly pressing inward upon the detent 131. The detent may be circular in section and have a non-circular end 139 forming a shoulder engaged by the spring 135 which may be formed with a similar non-circular opening for assemly with the detent.

The operation of this second form of the invention is substantially the same as in the case of the form first described. The rack is moved upwardly by the actuating device. In so moving it rotates the pinion 57' and with it the camshaft and cam. When being so moved, spring 127 is compressed by the upper end of rod 117 as the non-circular end of this rod moves within the recess of the cylindrical member 123. The compressed condition of spring 127 affords the energy to downwardly reciprocate rod 117 and rack 61' when the pedal pressure is released. To adjust for lining wear it is only necessary to apply wrench to the flat end 125 of part 123 and rotate the same. Since rod 117 cannot move downwardly owing to its engagement with the lever end of rockshaft 79, the rotation of rod 117 causes an upward reciprocation of rack 61' and rotation of the cam to a new position in which the clearance between the drum and the shoes is taken up.

The invention thus provides a simple effective and compact brake actuating mechanism and one having associated therewith a readily accessible and easily operable external adjusting device to correct for wear of the brake lining. In both forms of the invention, the steering wheels may be oscillated on the king pin with no interference with the relative positions of the parts concerned with the application of the brake.

I claim:

1. In brake mechanism cooperating brake means, a reciprocating rack, a rotatable pinion engaged with said rack, means to reciprocate said rack and rotate said pinion, means actuated by the rotation of the pinion to cause frictional engagement of said brake members, means independent of said rack reciprocating means to change the relative positions of said rack and pinion and to adjust the normal relative position of said rack and pinion.

2. In a front wheel brake for vehicles, an axle, a stub axle, a king pin about which said stud axle may oscillate relative to said axle, a wheel on said stub axle, co-operating brake members, one rotatable with said wheel, a rack positioned in longitudinal alignment with said king pin, a rock shaft having a lever arm engaging said rack between the adjacent ends of said rack and king pin to reciprocate said rack, means to effect frictional engagement of said brake members, a pinion engaging said rack and operatively engaged with said means to effect the engagement of said brake members.

3. In a brake for a dirigible wheel, a king pin about which said wheel may oscillate, a rack in axial alignment with said king pin, a pinion engaging said rack, brake means associated with said wheel, means connecting said pinion and brake means to render said brake means effective, means to reciprocate said rack, independent means associated with said rack and pinion to change the relative normal position of said parts and thereby adjust brake clearance.

4. In a brake, means to operate said brake comprising a reciprocating worm rack and a brake actuating pinion engaging said rack.

5. In a brake, means to operate said brake comprising a reciprocating worm rack and a brake applying pinion, means to reciprocate the rack to apply the brake, and means to rotate the rack to adjust the brake.

6. In a brake, means to operate said brake comprising a reciprocating rack and a brake operating pinion, means to reciprocate the rack to apply the brake, independent means to move the rack to adjust the brake.

7. In a brake, means to operate said brake comprising a reciprocating rack, means operable upon and through the instrumentality of the rack to apply the brake, other means operable upon and through the instrumentality of the rack to vary the normal relative position of said rack and pinion to adjust the release position of said brake.

8. The invention defined by claim 7, said rack being a worm rack and said last-named means connected to said rack to rotate the same.

9. In combination, an axle, a stub axle, a king pin to permit swivelling of said stub axle, a reciprocating rack, a pinion associated therewith, brake means, mechanism operatively connecting the pinion and brake means, means to reciprocate the rack and other means to adjust the relative position of said pinion and rack in brake release position, said king pin, rack and adjusting means being in longitudinal alignment.

10. The invention set forth in claim 9, said adjusting means and rack being mounted for relative longitudinal movement in applying the brake.

11. Brake operating means comprising a rack mounted to reciprocate, a pinion engaging said rack and mounted to rotate, brake means, mechanical connections between said pinion and brake means, yieldable means operable upon said rack to restore the rack and pinion and brake operating means to release position, together with a rotatable adjusting means axially aligned with said rack, said yieldable means housed within said adjusting means.

12. Brake mechanism for steering wheels comprising an axle, a knuckle having a stub axle, a king pin for pivotally mounting the knuckle, a casing secured to said king pin, a casing rigidly secured to said knuckle, a rack slidable in said last-named casing, said rack being axially in alignment with said king pin, a rockshaft journaled on said axle, said rockshaft having a lever end in said first-named casing and engaging said rack, a shaft journaled in said second casing substantially at right angles to said rack, a pinion on said shaft engaging said rack, brake mechanism associated with said wheel and operated by said pinion shaft.

13. The invention defined by claim 12, together with rotatably adjusting means in said second casing for manually adjusting the relative position of said rack and pinion, and through the instrumentality of the rack and pinion, the brake means.

14. Brake operating and adjusting means comprising brake mechanism, a reciprocating rack, a pinion engaging said rack, mechanical connections between said pinion and brake means, an adjusting element non-rotatably associated with said rack, fixed means, yielding means normally holding said adjusting means engaged with said fixed means and functioning to resist the reciprocation of said rack in one direction, whereby said yielding means returns the rack and pinion to a predetermined normal position and prevents the rotation of said adjusting means together with the rack during brake application.

15. In a brake, relatively rotatable coaxial members, a rack reciprocally mounted in one of said members, a pinion shaft rotatably mounted in said member on an axis substantially at right angles to the longitudinal axis of said rack, mechanism associated with said pinion shaft to apply to the brake, operating means in said second member to reciprocate said rack.

16. The invention defined by claim 15, together with means in said first member axially in alignment with said reciprocating rack for adjusting the relative normal position of said rack and pinion.

17. In a brake, relatively rotatable members, a rack reciprocally mounted in one of said members, a pinion shaft rotatably mounted in said member on an axis substantially at right angles to the longitudinal axis of said rack, mechanism associated with said pinion shaft to apply to the brake, operating means in said second member to reciprocate said rack, together with means in said first member axially in alignment with said reciprocating rack for adjusting the relative normal position of said rack and pinion, said last-named means consisting of a serrated washer in said member, a rotatable serrated disc engaging said washer, said disc having a non-circular extension inter-engaging a correspondingly shaped portion of said rack.

18. In a brake, relatively rotatable members, a rack reciprocally mounted in one of said members, a pinion shaft rotatably mounted in said member on an axis substantially at right angles to the longitudinal axis of said rack, mechanism associated with said pinion shaft to apply to the brake, operating means in said second member to reciprocate said rack, together with means in said first member axially in alignment with said reciprocating rack for adjusting the relative normal position of said rack and pinion, said last-named means consisting of a serrated washer in said member, a rotatable serrated disc engaging said washer, said disc having a non-circular extension interengaging a correspondingly shaped portion of said rack, and a spring between said rack and said disc.

19. In a brake, relatively rotatable members, a rack reciprocally mounted in one of said members, a pinion shaft rotatably mounted in said member on an axis substantially at right angles to the longitudinal axis of said rack, mechanism associated with said pinion shaft to apply to the brake, operating means in said second member to reciprocate said rack, together with means in said first member axially in alignment with said reciprocating rack for adjusting the relative normal position of said rack and pinion, said last-named means consisting of a rotating cylinder, a rod threadedly engaging said rack and non-rotatably and slidably engaging said cylinder.

In testimony whereof, I affix my signature.

ALBERT W. FREHSE.